United States Patent
Linzer et al.

(10) Patent No.: US 8,531,549 B1
(45) Date of Patent: Sep. 10, 2013

(54) CAMERA THAT USES YUV TO YUV TABLE-BASED COLOR CORRECTION FOR PROCESSING DIGITAL IMAGES

(75) Inventors: Elliot N. Linzer, Suffern, NY (US); Leslie D. Kohn, Saratoga, CA (US)

(73) Assignee: Ambarella, Inc., Santa Clara, CA (US)

( * ) Notice: Subject to any disclaimer, the term of this patent is extended or adjusted under 35 U.S.C. 154(b) by 425 days.

(21) Appl. No.: 12/712,307

(22) Filed: Feb. 25, 2010

(51) Int. Cl.
*H04N 9/73* (2006.01)

(52) U.S. Cl.
USPC .................................. 348/223.1; 348/222.1

(58) Field of Classification Search
USPC ............................. 348/223.1, 222.1; 386/68
See application file for complete search history.

(56) References Cited

U.S. PATENT DOCUMENTS

| | | | |
|---|---|---|---|
| 4,275,413 A | 6/1981 | Sakamoto et al. | 358/80 |
| 7,536,487 B1 | 5/2009 | Kohn | 345/503 |
| 7,982,744 B2 | 7/2011 | Moriya et al. | 345/581 |
| 2002/0048084 A1 | 4/2002 | Matsuda | 359/505 |
| 2002/0191085 A1 | 12/2002 | Jaspers | 348/223.1 |
| 2004/0105261 A1 | 6/2004 | Ducharme et al. | 362/231 |
| 2004/0141162 A1 | 7/2004 | Olbrich | 353/119 |
| 2004/0156618 A1* | 8/2004 | Hoshi | 386/68 |
| 2005/0190198 A1* | 9/2005 | Koyama | 345/593 |

OTHER PUBLICATIONS

"MT9T001 3-Megapixel Digital Image Sensor—½-Inch 3-Megapixel CMOS Active-Pixel Digital Image Sensor", 2003 Micron Technology Inc., pp. 1-37.
"Digital Negative (DNG) Specification", Version 1.3.0.0, Adobe Systems Incorporated, Jun. 2009, pp. 1-89.

\* cited by examiner

*Primary Examiner* — Gevell Selby
(74) *Attorney, Agent, or Firm* — Christopher P. Maiorana, PC

(57) ABSTRACT

An apparatus having a circuit is disclosed. The circuit may be configured to (i) process a digital image received from a camera sensor and (ii) color correct at least one pixel of the digital image after the processing. The color correction generally includes a lookup table-based conversion of the pixel from a first luminance-and-chrominance representation to a second luminance-and-chrominance representation.

20 Claims, 10 Drawing Sheets

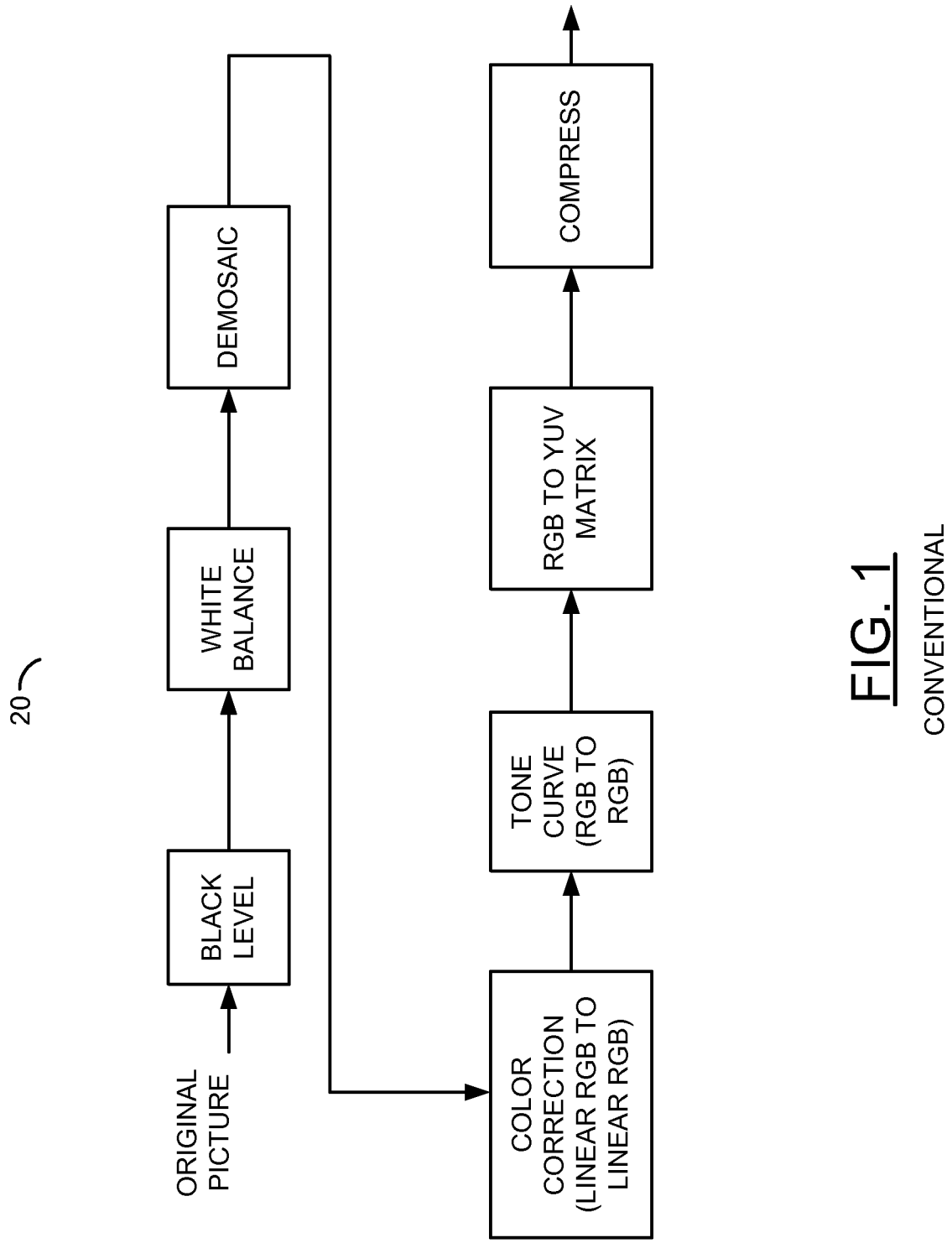
FIG. 1
CONVENTIONAL

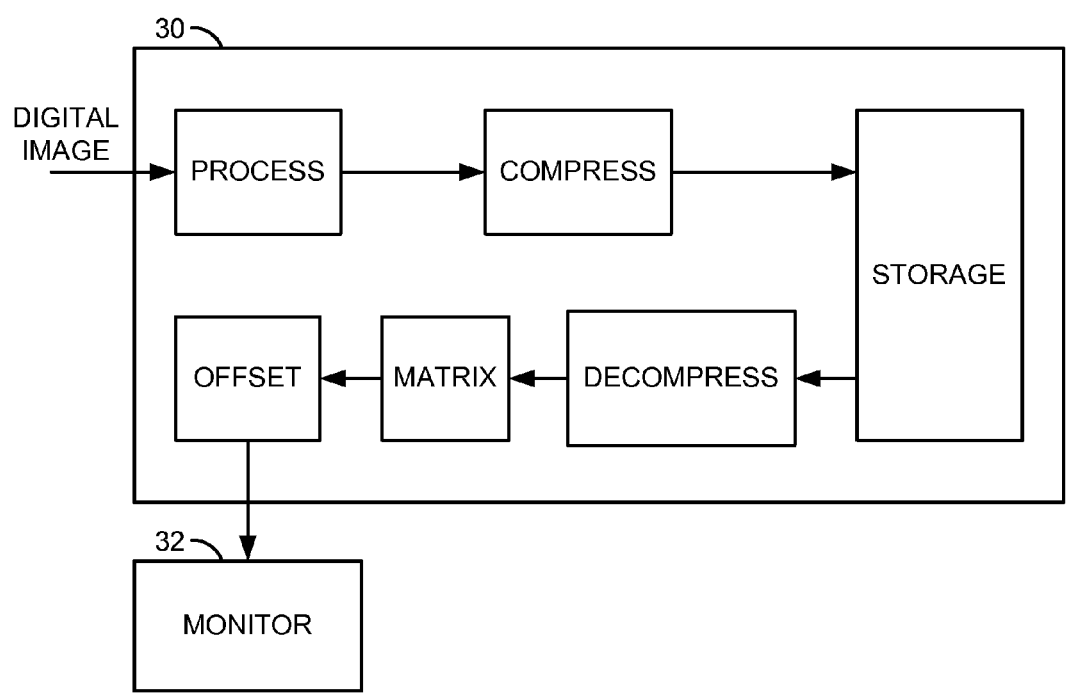
FIG. 2
CONVENTIONAL

CAMERA THAT USES YUV TO YUV TABLE-BASED COLOR CORRECTION FOR PROCESSING DIGITAL IMAGES

CROSS REFERENCE TO RELATED APPLICATIONS

The present application is related to co-pending U.S. application Ser. No. 12/706,816 filed Feb. 17, 2010, which is hereby incorporated by reference in its entirety.

FIELD OF THE INVENTION

The present invention relates to a method and/or architecture for digital cameras generally and, more particularly, to a camera that uses YUV to YUV table-based color correction for processing digital images.

BACKGROUND OF THE INVENTION

Referring to FIG. 1, a block diagram of a conventional camera color processing pipeline 20 is shown. Color correction is commonly used in digital cameras because a spectral response of the camera photo-receptors does not match a desired response in an output color space. The color correction is used to produce a picture that has accurate and aesthetically pleasing colors.

Several conventional color correction methods are currently available. Some methods use a matrix (M) multiplication to calculate an RGB output vector from a red, green, blue (RGB) input vector, such as:

$$R\_out = M11 \times R\_in + M12 \times G\_in + M13 \times B\_in$$

$$G\_out = M21 \times R\_in + M22 \times G\_in + M23 \times B\_in$$

$$B\_out = M31 \times R\_in + M32 \times G\_in + M33 \times B\_in$$

For example, the Adobe "Digital Negative (DNG) Specifications" file format specifies color correction by means of a matrix. Other conventional color correction methods use a three-dimensional lookup table, with interpolation between the table entries. For example, U.S. Pat. No. 4,275,413 describes a method for tetrahedral interpolation.

Different color corrections are commonly used for video and still pictures. The reason is that an output space for the video is typically different from an output space for the still pictures. The still pictures typically uses the sRGB color space whereas video typically uses either the ITU-R Recommendation BT.601 or the ITU-R Recommendation BT.709.

A conventional color space conversion between an RGB color space and a YUV color space is accomplished by matrix multiplication and adding offsets. The color space conversion is reversible, except for minor differences that result from rounding intermediate and final results. The specific formulae converting between the RGB color space and the YUV color space are different for converting video and converting still pictures. Moreover, a tone curve used for correcting video can be different from the tone curve used for correcting still pictures. Therefore, the YUV data in a video sequence differs from that in still pictures in three ways: (i) the meaning of the YUV sample values relative to RGB amplitudes is different, (ii) the underlying RGB values describe different light sources and (iii) different tone curves.

Referring to FIG. 2, a block diagram of a conventional still camera 30 is shown. The still camera 30 or a conventional hybrid video/still camera can have a video connector that allows the camera 30 to display still pictures on a video monitor 32. The camera 30 commonly performs matrix and offset computations to make the still picture colors appear accurate and/or pleasing when displayed on the monitor 32.

While conventional matrix and offset adjustments may make colors accurate when still pictures are played back on the monitor 32, it would be desirable to make the colors of a still picture played back on the monitor 32 even more accurate.

SUMMARY OF THE INVENTION

The present invention concerns an apparatus having a circuit. The circuit may be configured to (i) process a digital image received from a camera sensor and (ii) color correct at least one pixel of the digital image after the processing. The color correction generally includes a lookup table-based conversion of the pixel from a first luminance-and-chrominance representation to a second luminance-and-chrominance representation.

The objects, features and advantages of the present invention include providing a camera that uses YUV to YUV table-based color correction for processing digital images that may (i) provide effective noise reduction, (ii) reproduce colors of still pictures accurately on a television monitor, (iii) perform a lookup table-based color correction in a luminance-and-chrominance color space and/or (iv) color correct still pictures in other than linear red-green-blue color space.

BRIEF DESCRIPTION OF THE DRAWINGS

These and other objects, features and advantages of the present invention will be apparent from the following detailed description and the appended claims and drawings in which:

FIG. 1 is a block diagram of a conventional camera color processing pipeline;

FIG. 2 is a block diagram of a conventional still camera;

DETAILED DESCRIPTION OF THE PREFERRED EMBODIMENTS

From a quality point of view (e.g., better quality meaning more noise reduction with fewer or less objectionable artifacts, such as loss of sharpness and detail), filtering digital images at different places in the electronics of a camera have different advantages. For example, filtering after the digital image has been converted from a red-green-blue (RGB) color space to a luminance-and-chrominance (e.g., YUV) color space may be advantageous in terms of noise reduction. The type and amount of filtering optimal for chrominance are generally different from the type and amount of filtering optimal for luminance. Therefore, chrominance is typically filtered more heavily than luminance. As such, some embodiments of the present invention generally concern a camera that uses YUV to YUV lookup table-based color correction for processing digital images for storage and/or for display.

Figure 3:
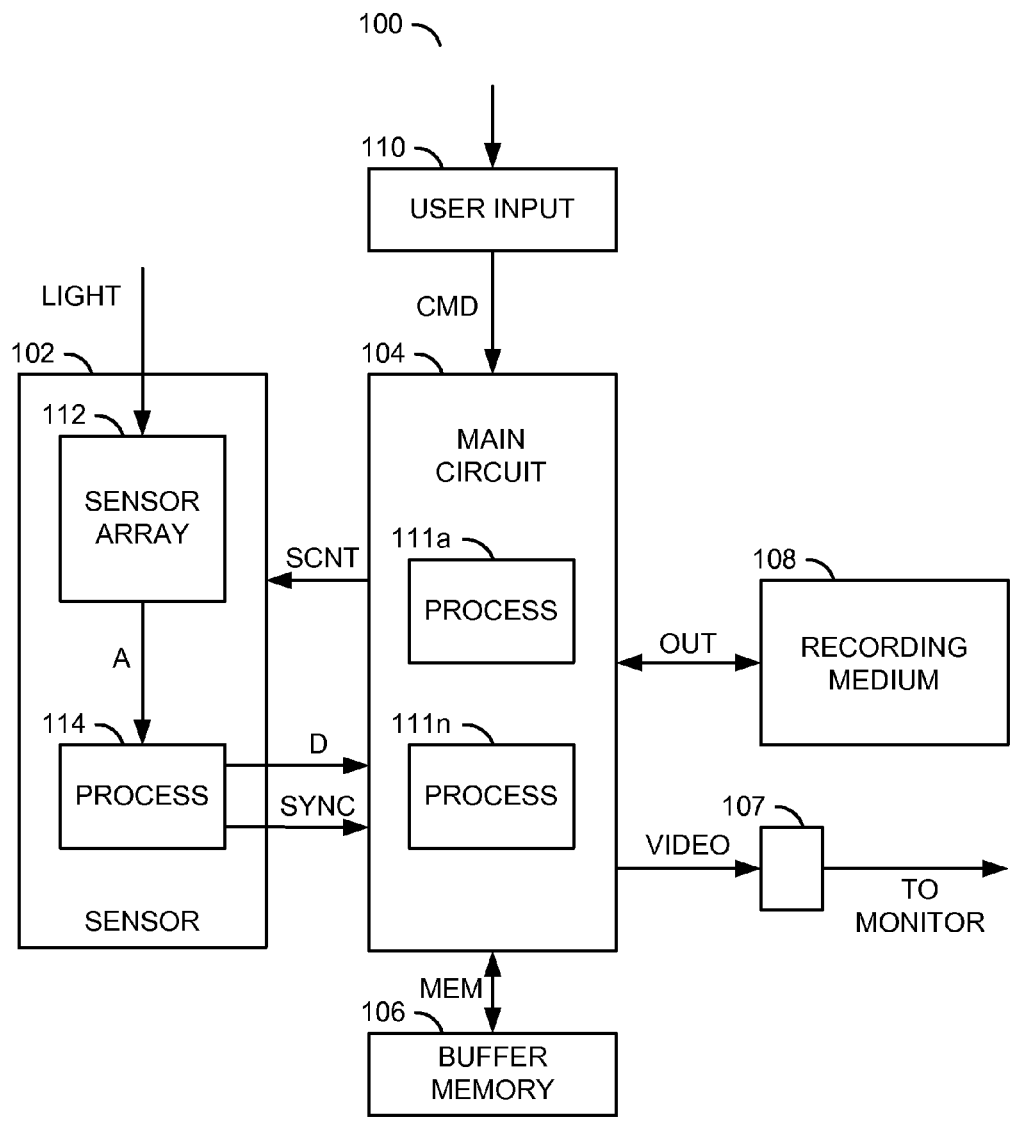
FIG. 3 is a block diagram of an example implementation of an apparatus in accordance with a preferred embodiment of the present invention.

Referring to FIG. 3, a block diagram of an example implementation of an apparatus 100 is shown in accordance with a preferred embodiment of the present invention. The apparatus (or system) 100 may form a digital still camera and/or camcorder. The apparatus 100 generally comprises a circuit (or module) 102, a circuit (or module) 104, a circuit (or module) 106, a circuit (or port) 107, a circuit (or module) 108 and a circuit (or module) 110. An optical signal (e.g., LIGHT) may be received by the circuit 102. The circuit 102 may generate and present a digital signal (e.g., D) to the circuit 104. A synchronization signal (e.g., SYNC) may also be generated by the circuit 102 and received by the circuit 104. A sensor control signal (e.g., SCNT) may be generated and presented from the circuit 104 to the circuit 102. A signal (e.g., OUT) may be exchanged between the circuit 104 and the circuit 108. The circuit 104 may generate and present a signal (e.g., VIDEO) through the interface 107 to a monitor outside the apparatus 100. A command signal (e.g., CMD) may be generated by the circuit 110 and presented to the circuit 104. A signal (e.g., MEM) may be exchanged between the circuit 104 and the circuit 106. The circuits 102 to 110 may be implemented in hardware, software, firmware or any combination thereof.

The circuit 102 may implement an electro-optical sensor circuit. The circuit 102 is generally operational to convert the optical image received in the signal LIGHT into the signal D based on parameters received in the signal SCNT. The signal D may convey the one or more optical images as one or more digital images (e.g., fields, frames, pictures). The signal SYNC generally conveys synchronization information related to the images and the pixels within. The signal SCNT may carry windowing, binning, read rate, offset, scaling, color correction and other configuration information for use by the circuit 102. The images may be generated having an initial resolution and an initial color space (e.g., a Bayer color space) at an initial data rate. In some embodiments, the circuit 102 may include an image pipeline or other image source that supplies source images in the signal D.

The circuit 104 may be referred to as a main circuit. The circuit 104 is generally operational to generate the signal OUT by processing the images received in the signal D. The circuit 104 may be operational to generate the signal SCNT based on the user selections received through the signal CMD. The circuit 104 may load and store data to the circuit 106 through the signal MEM. The signal OUT generally comprises a still image (e.g., JPEG) and/or a sequence of images (or pictures). The signal VIDEO generally comprises a video signal (e.g., ITU-R BT.601, ITU-R BT.709, ITU-R BT.656-4, H.264/AVC, MPEG-2 or MPEG-4). Other standard and/or proprietary still picture and/or video compression standards may be implemented to meet the criteria of a particular application.

The circuit 104 generally comprises two or more circuits (or modules) 111a-111n. Each of the circuits 111a-111n may be configured to perform one or more operations on the images to achieve final images in the signals OUT and VIDEO. Processing of the images may include, but is not limited to, decimation filtering, interpolation, formatting, color space conversions, color corrections, tone corrections, gain corrections, offset corrections, black level calibrations, white balancing, image sharpening, image smoothing, and the like. In some embodiments, the processing may be implemented in whole or in part by software running in the circuits 111a-111n. In some embodiments, the circuit 102 and the circuit 104 may be fabricated in (on) separate dies. In other embodiments, the circuit 102 and the circuit 104 may be fabricated in (on) the same die. Additional details of the circuit 104 may be found in U.S. Pat. No. 7,536,487, hereby incorporated by reference in its entirety.

The circuit 106 may implement a buffer memory. The circuit 106 is generally operational to temporarily store image data (e.g., luminance and chrominance) for the circuit 104. In some embodiments, the circuit 106 may be fabricated as one or more dies separate from the circuit 104 fabrication. In other embodiments, the circuit 106 may be fabricated in (on) the same die as the circuit 104. The circuit 106 may implement a double data rate (DDR) synchronous dynamic random access memory (SDRAM). Other memory technologies may be implemented to meet the criteria of a particular application.

The circuit 107 may implement a connector. The circuit 107 is generally configured to allow the apparatus 100 to be connected to a television or computer monitor (e.g., the monitor 32). Formats for the circuit 107 may include, but are not limited to, a component interface, s-video interface, a High-Definition Multimedia Interface (HDMI) interface and the like.

The circuit 108 may implement a medium. The medium 108 generally comprises one or more nonvolatile memory devices capable of storing the signal OUT. In some embodiments, the recording medium 108 may comprise a single memory medium. For example, the recording medium 108 may be implemented as a FLASH memory or a micro hard disk drive (also known as a "1-inch" hard drive). The memory may be sized (e.g., 4 gigabyte FLASH, 12 gigabyte hard disk drive). In some embodiments, the recording medium 108 may be implemented as multiple media. For example, (i) a FLASH memory may be implemented and (ii) a tape medium or an optical medium may be implemented for recording the signal OUT. Other types of media may be implemented to meet the criteria of a particular application.

The circuit 110 may implement a user input circuit. The circuit 110 may be operational to generate the signal CMD based on commands received from a user. The commands received may include, but are not limited to, a take still picture command, a start recording command, a stop recording command, a zoom in command and a zoom out command. In some embodiments, the signal CMD may comprise multiple discrete signals (e.g., one signal for each switch implemented in the user input circuit 110). In other embodiments, the signal CMD may carry the user entered commands in a multiplexed fashion as one or a few signals.

The circuit 102 generally comprises a sensor array 112 and a circuit (or module) 114. The array 112 may be operational to convert the optical images into a series of values in an analog signal (e.g., A). The values conveyed in the signal A may be analog voltages representing an intensity value at a predetermined color for each individual sensor element of the circuit 112. The circuit 112 may include an electronic cropping (or windowing) capability. The electronic cropping capability may be operational to limit readout of image elements in a window (or an active area) of the circuit 112. The circuit 114 may be operational to process and then convert the analog signal A to generate the digital signal D. The circuits 112 and 114 may be implemented in hardware, software, firmware or any combination thereof.

Processing of the electronic images in the circuit 114 may include, but is not limited to, analog gain for color corrections and analog offset adjustments for black level calibrations. The conversion generally comprises an analog to digital conversion (e.g., 10-bit). An example implementation of the circuit 102 may be an MT9T001 3-megapixel digital image sensor available from Micron Technology, Inc., Bosie, Id. Larger or smaller circuits 102 may be implemented to meet the criteria of a particular application.

Figure 4:
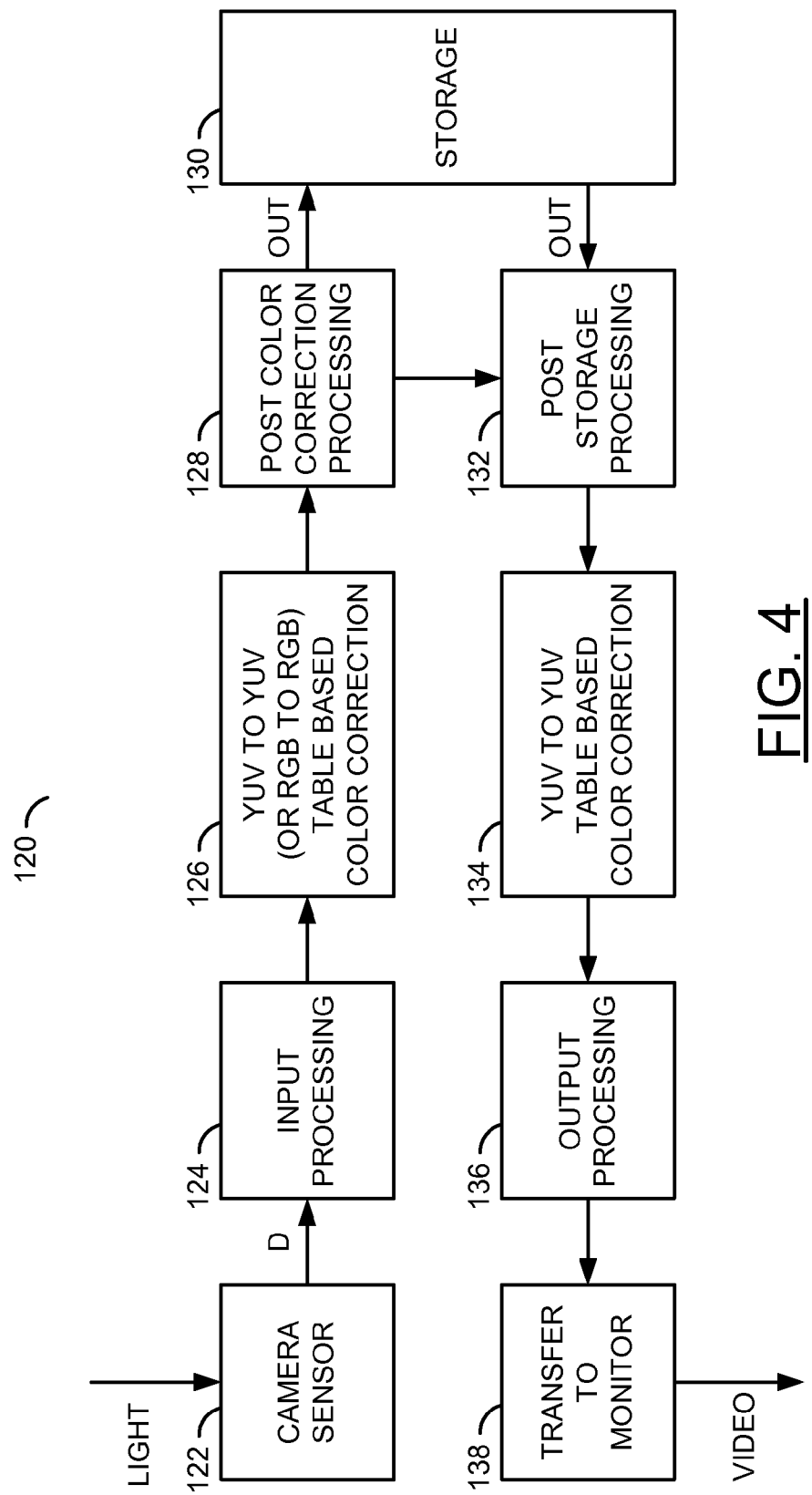
FIG. 4 is a functional block diagram of a general image processing method.

Referring to FIG. 4, a functional block diagram of a general image processing method 120 is shown. The method (or process) 120 may be implemented by the apparatus 100. The method 120 generally comprises a step (or block) 122, a step (or block) 124, a step (or block) 126, a step (or block) 128, a step (or block) 130, a step (or block) 132, a step (or block) 134, a step (or block) 136 and a step (or block) 138.

In the step 122, the circuit 102 may convert the incoming signal LIGHT into the signal D. The signal D may be initially processed by the circuit 104 in the step 124. The initial processing may include, but is not limited to, white balancing, demosaicing, resizing and conversion of the digital images into the YUV color space. In the step 126, the circuit 104 (e.g., circuit 111c) may perform a lookup table-based color correction of the images (e.g., either a YUV to YUV correction or an RGB to RGB correction). The conversion generally maps the images from a linear color space to a tone corrected color space. The conversion may mix the components of the linear color space (e.g., at least one of the output RGB components varies based on at least two of the input RGB components) as well as convert from a linear space to a nonlinear space. Additional post-color correction processing may be performed by the circuit 104 in the step 128. The step 128 processing may include, but is not limited to, resizing, noise filtering, tone correction, RGB to YUV color space conversion, compression and formatting for storage. In a recording mode, the images may be written into the circuit 108 in the step 130. A copy of the image being stored may also be transferred directly to the step 132. In a viewing mode, the images may bypass storage in the circuit 108 and instead, be routed to the step 132.

In the step 132, either (i) a sequence of live images received from the step 128 while in the viewing and/or recording mode or (ii) a previously recorded still image read from the circuit 108 in a playback mode may be processed by the circuit 104. The step 132 processing may include, but is not limited to, reformatting from storage, decompression, resizing, changing an aspect ratio and noise filtering. The circuit 104 (e.g., circuit 111d) may perform a lookup table-based color correction of the images in the step 134. In the step 136, the images may undergo output processing in the circuit 104. The step 136 processing generally converts the images into one or more formats suitable to present to a monitor. In the step 138, the signal VIDEO may be presented from the circuit 107 to the monitor for display.

Figure 5:
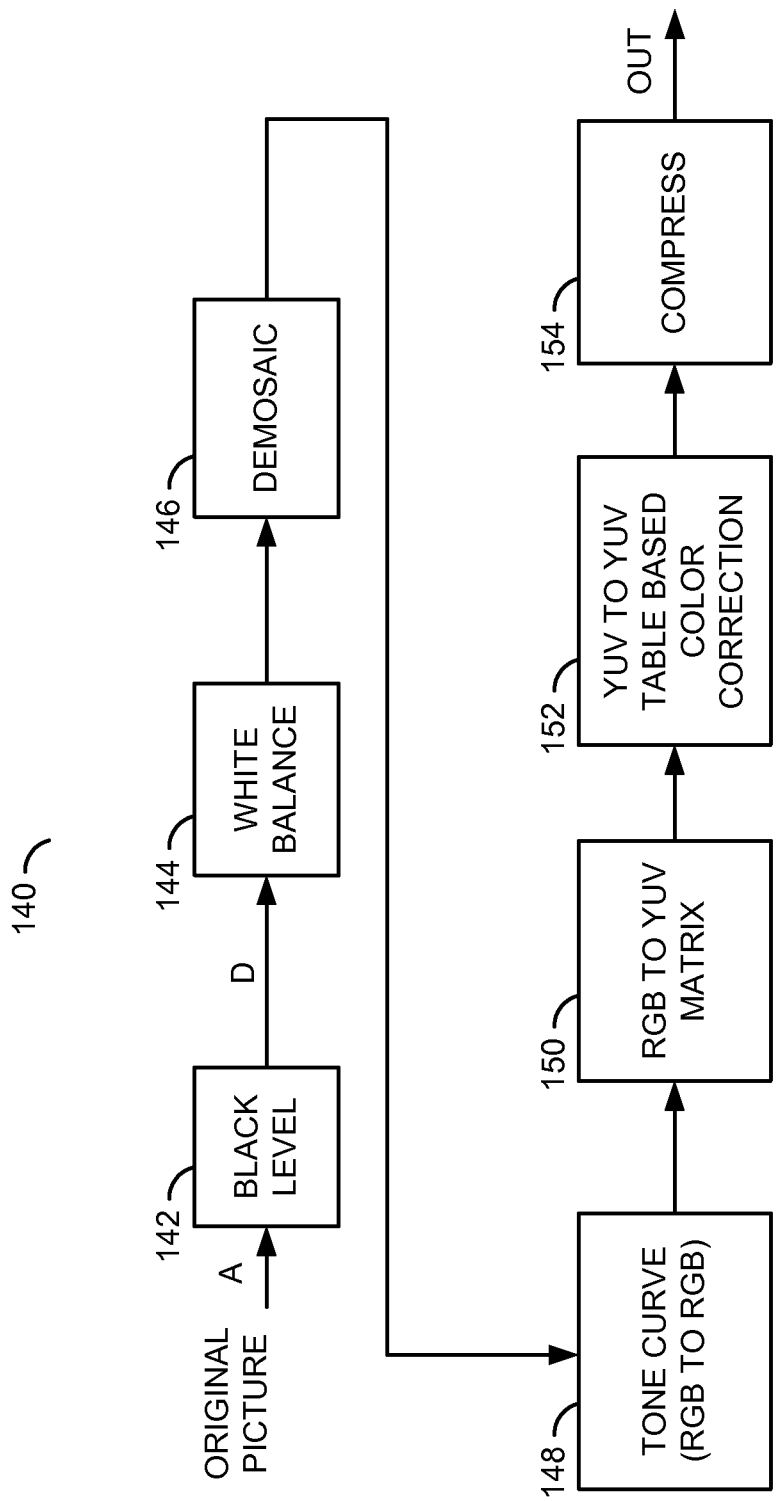
FIG. 5 is a functional block diagram of a still image processing method.

Referring to FIG. 5, a functional block diagram of a still image processing method 140 is shown. The method (or process) 140 may be implemented by the apparatus 100. The method 140 generally comprises a step (or block) 142, a step (or block) 144, a step (or block) 146, a step (or block) 148, a step (or block) 150, a step (or block) 152 and a step (or block) 154.

In the step 142, the circuit 102 may perform a black level correction on the original picture or pictures received via the signal A. Once digitized, each digital image may undergo a white balancing in the step 144 within the circuit 104. A demosaicing of the images is generally performed by the circuit 104 (e.g., circuit 111a) in the step 146.

In the step 148, the circuit 104 (e.g., circuit 111b) may perform a tone curve correction of the images. The tone curve correction may be performed in the RGB color space. The circuit 104 may convert the tone corrected images from the RGB color space to a YUV color space by a matrix multiplication in the step 150. In the step 152, the circuit 104 (e.g., circuit 111c) may perform a lookup table-based color correction of the images. The images are generally compressed by the circuit 104 to generate the signal OUT in the step 154.

Because the lookup table-based color correction step 152 may be used for a general three-input to three-output mapping, the method 140 may allow for the creation of substantially the same colors in the resulting images as if the color correction was done in the RGB color space (e.g., FIG. 1). Furthermore, since the color correction step 152 may be performed after luminance and chrominance separation, the resulting noise reduction may be more effective than using normal RGB color correction.

Figure 6:
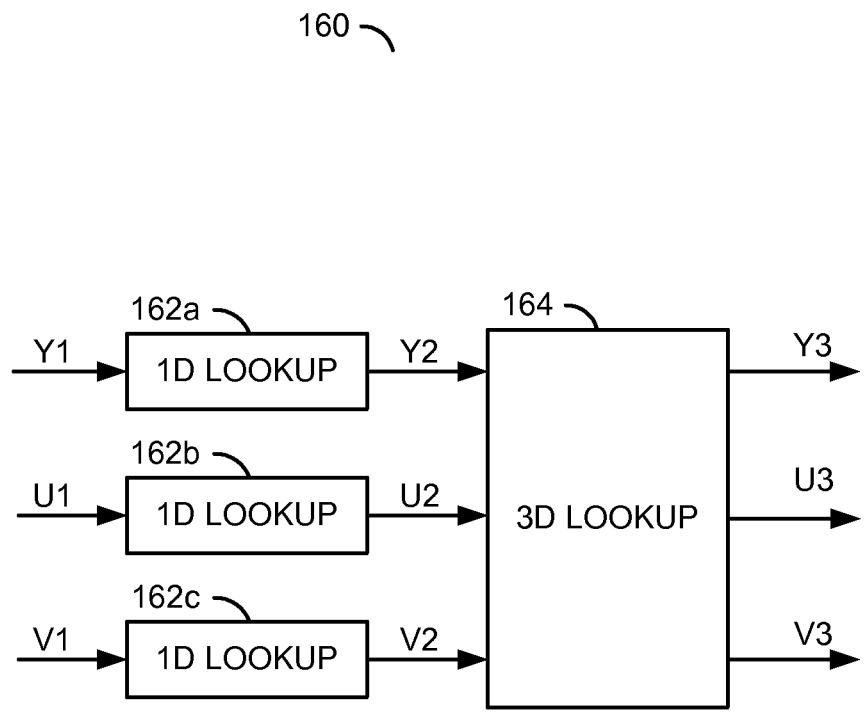
FIG. 6 is a block diagram of an example implementation of a lookup circuit.

Referring to FIG. 6, a block diagram of an example implementation of a lookup circuit 160 is shown. The circuit (or module) 160 may be created as part of the circuit 104 and may implement the steps 126, 134 and/or 152. The circuit 160 generally comprises multiple circuits (or module) 162a-162c and a circuit (or module) 164. The circuits 162a-164 may be implemented in hardware, software, firmware or any combination thereof.

The circuit 162a may receive an individual component (e.g., luminance) of the images in a signal (e.g., Y1). A signal (e.g., Y2) may carry a converted version of the luminance component from the circuit 162a to the circuit 164. The circuit 164 may generate and present another converted version of the luminance component in a signal (e.g., Y3). Another component (e.g., chrominance) of the images may be received by the circuit 162b in a signal (e.g., U1). The circuit 162b may generate a converted version of the chrominance component to the circuit 164 in a signal (e.g., U2). A signal (e.g., U3) may be generated by the circuit 164 conveying another converted version of the chrominance component. Yet another component (e.g., another chrominance) of the images may be received by the circuit 162c in a signal (e.g., V1). The circuit 162c may generate and present a converted version of the component in a signal (e.g., V2) to the circuit 164. The circuit 164 may generate and present still another converted version of the component in a signal (e.g., V3).

Figure 7:
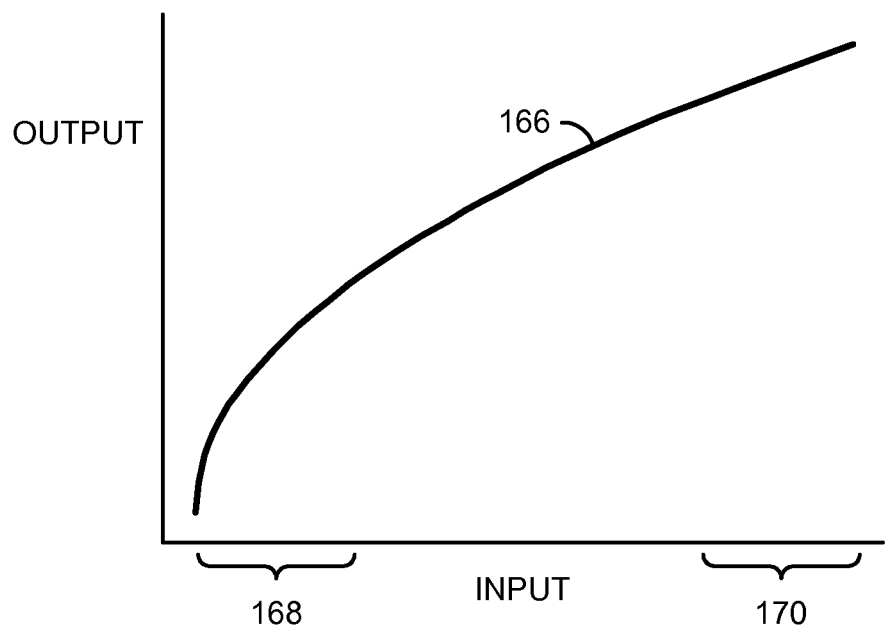
FIG. 7 is a block diagram of an example one-dimensional nonlinear transfer function.

Each of the circuits 162a-162c generally implements a one-dimensional lookup table. Each of the circuits 162a-162c may be operational to map the corresponding input components of the images from one YUV space to another YUV space. The mapping may be implemented such that an effective separation between individual values of the components vary from a one side (e.g., bottom) to an opposite side (e.g., top) of the range of possible values. For example, as illustrated in FIG. 7, a transfer curve 166 stored in the circuits 162a-162c may be more steeply spaced at the bottom side of the range (e.g., region 168) compared with the top side of the range (e.g., region 170). Therefore, relatively small changes in dark luminance signals Y1 may be expanded in the signals Y2 to cover more entries in the circuit 164. As such, dark colors may receive more accurate color correction at the expense of bright colors, which may get less accurate color correction. In some embodiments, all of the circuit 162a-162c may store the same transfer curve 166. In other embodiments, each of the circuits 162a-162c may store a different version of the transfer curve 166.

The circuit 164 may implement a multidimensional (e.g., three-dimensional) lookup table. The circuit 164 may be operational to convert the images from the color space established by the signals Y2, U2 and V2 into a color corrected space in the signals Y3, U3 and V3. In some embodiments, the lookup table-based correction may be performed in an RGB color space with the three input signals and three output signals representing the red components, green components and blue components of the images.

A combination of the circuits 162a-162c and the circuit 164 may convert the images from the original YUV color space as received from the steps 124, 132 and/or 150 into a color corrected YUV color space presented to the respective steps 128, 136 and/or 154. In some embodiments, the circuits 162a-162c may be eliminated and the signals Y1, U1 and V1 may be received directly by the circuit 164.

In some embodiments, the three-dimensional tables of circuit 164 may not cover every possible combination of input values. The lookup tables of the circuit 164 may have a coarse spacing between entries to achieve a reduced size and/or power. Even with the coarse spacing, the number of entries may be large due to the three-dimensional nature of the lookups. For example, if a three-dimensional lookup is 33×33×33, then 35937 entries may be calculated and stored. If a lookup is 16×16×16, then 4096 entries may be calculated and stored. Therefore, the circuit 164 may include an interpolation operation between the table entries. In some embodiments, trilinear interpolation may be used to estimate between the table entries. In some embodiments, a tetrahedral interpolation may be used, as described in U.S. Pat. No. 4,275,413, which is hereby incorporated by reference in its entirety. Other interpolation methods may be implemented to meet the criteria of a particular application. A combination of the lookup and interpolation may approximate a true three-dimensional transformation, with the approximation being more accurate as the number of entries increases. Based on the type of color correction done, finer spacing for more accurate color correction may be used in some colors more than in other colors.

Figure 8:
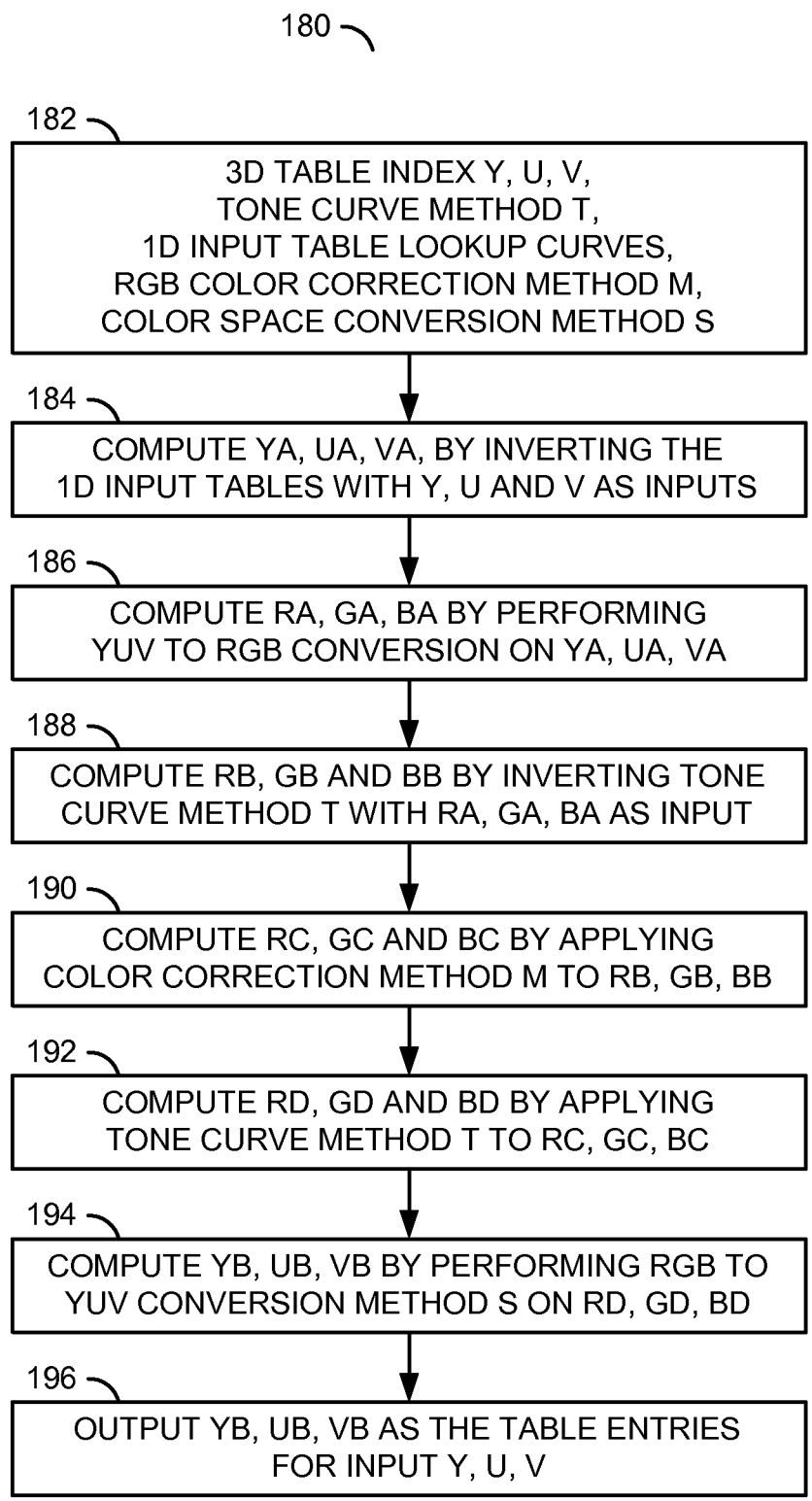
FIG. 8 is a flow diagram of an example method for programming a three-dimensional table for color correction ahead of storage.

Referring to FIG. 8, a flow diagram of an example method 180 for programming a three-dimensional table for color correction ahead of storage is shown. The method (or process) 180 may be implemented by a computer external to the apparatus 100. The entries calculated by the method 200 may be loaded into the circuit 104 (e.g., the circuit 164) to achieve a YUV to YUV color correction (e.g., step 152). The method 180 generally comprises a step (or block) 182, a step (or block) 184, a step (or block) 186, a step (or block) 188, a step (or block) 190, a step (or block) 192, a step (or block) 194 and a step (or block) 196.

The table entries are generally programmed (e.g., steps 184 to 188) to undo the effects of all color processing after white balance and before the lookup. In the step 182, criteria of the circuit 164 may be determined. The criteria generally includes, but is not limited to, (i) a range of table index values (e.g., Y, U and V) for the signals Y2, U2 and V2, (ii) a tone curve (correction) method (e.g., T) to be implemented, (iii) the curves of the circuits 162a-162c, (iv) a color correction method (e.g., M) to be implemented and (v) an RGB to YUV color space conversion method (e.g., S). The method T may be any standard or proprietary tone correction method. The method M may be any standard or proprietary RGB color correction method. The method S may be any standard or proprietary color space conversion method. The method 180 is generally applied for each entry in the circuit 164.

For example, if the circuit 164 implements a 16×16×16 table, the method 180 may be applied for each of Y, U and V=[0, 1, . . . , 15] for a total of 16×16×16=4096 combinations of Y, U and V. In some embodiments, the circuit 160 may use 14 bits for each of the signals Y1, U1, V1, Y2, U2 and V2, so that each may be represented as an integer in a range [0,16383] and 10 bits for each of the signals Y3, U3 and V3, so that each may be represented as an integer in a range [0,1023]. In the step 184, the values YA, UA and VA are generally computed as the input to the lookup table (e.g., Y1, U1, V1 into the circuit 160) that may correspond to the exact grid point Y, U, V. For example, Y, U, V=[1, 3, 5] may correspond to Y2, U2, V2=1×16383/15, 3×16383/15, 5×16383/15=[1092, 3277, 5461]. If the circuits 162a-162c implement identity tables, the step 184 may leave the values 1092, 3277, 5461 unchanged (e.g., inverse of identity=identity) so that YA, UA, VA may also have the values 1092, 3277, 5461. On the other hand, if the circuits 162a-162c implement nonlinear tables, like the curve 166 with a steep slope at the bottom and a flatter slope at the top, the step 184 may apply the inverse of such curves (steep slope at the top and a flatter slope at the bottom) to the values 1092, 3277, 5461 and compute, for example, values of 200, 1500, 5000.

In the step 186, a matrix of representative values (e.g., RA, GA and BA) may be calculated by performing a YUV to RGB conversion on the representative values YA, UA and VA. The YUV to RGB conversion may be an inverse of the RGB to YUV conversion of the step 150. In the step 188, a vector of representative values (e.g., RB, GB and BB) may be calculated be performing an inverse of the method T on the representative values RA, GA and BA.

The table entries may also be calculated to perform the same processing as is normally used for color correction and tone correction. In the step 190, a vector of representative values (e.g., RC, GC and BC) may be calculated be performing the RGB color correction method M on the representative values RB, GB and BB. The step 192 may calculate a vector of representative values (e.g., RD, GD and BD) be performing the RGB tone correction method T on the representative values RC, GC and BC. In some embodiments, the tone correction method T may be the same as in step 148 of FIG. 5.

In the step 194, the RGB to YUV color space conversion method S may be applied to the representative values RD, GD and BD to calculate a matrix of final values (e.g., YB, UB and VB) in the YUV color space. In some embodiments, the conversion method S may be the same RGB to YUV conversion as in step 152 of FIG. 5. The representative values YB, UB and VB may be loaded into the circuit 164 in the step 196. The final values generated by the method 180 may result in final colors that are substantially similar to the final colors that generally result when normal color processing is used.

Figure 9:
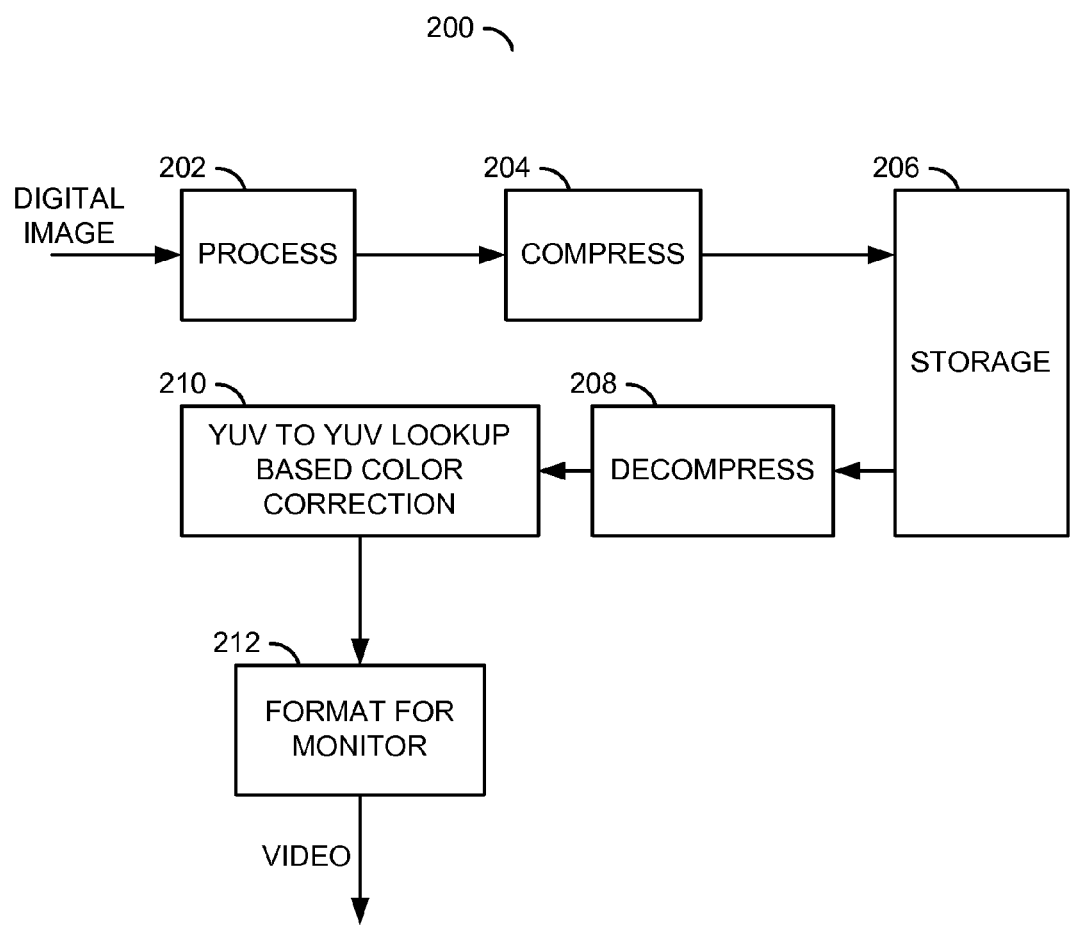
FIG. 9 is a functional block diagram of an example method of playback.

Referring to FIG. 9, a functional block diagram of an example method 200 of playback is shown. The method (or process) 200 may be implemented by the apparatus 100. The method 200 generally comprises a step (or block) 202, a step (or block) 204, a step (or block) 206, a step (or block) 208, a step (or block) 210 and a step (or block) 212.

In the step 202, the circuit 104 may process the incoming images received via the signal D. The processing may include, but is not limited to, white balancing, demosaicing, resizing, conversion of the digital images into the YUV color space, noise filtering, still picture color correcting, and formatting for storage. The circuit may compress the processed images in the step 204. The compressed images may be buffered in the circuit 108 in the step 206. In the step 208, the compressed images read from the circuit 108 may be decompressed by the circuit 104. A YUV to YUV lookup table-based color correction may be performed in the step 210 to establish video corrected colors. In the step 212, the corrected images may be formatted for use by a monitor and presented in the signal VIDEO.

Figure 10:
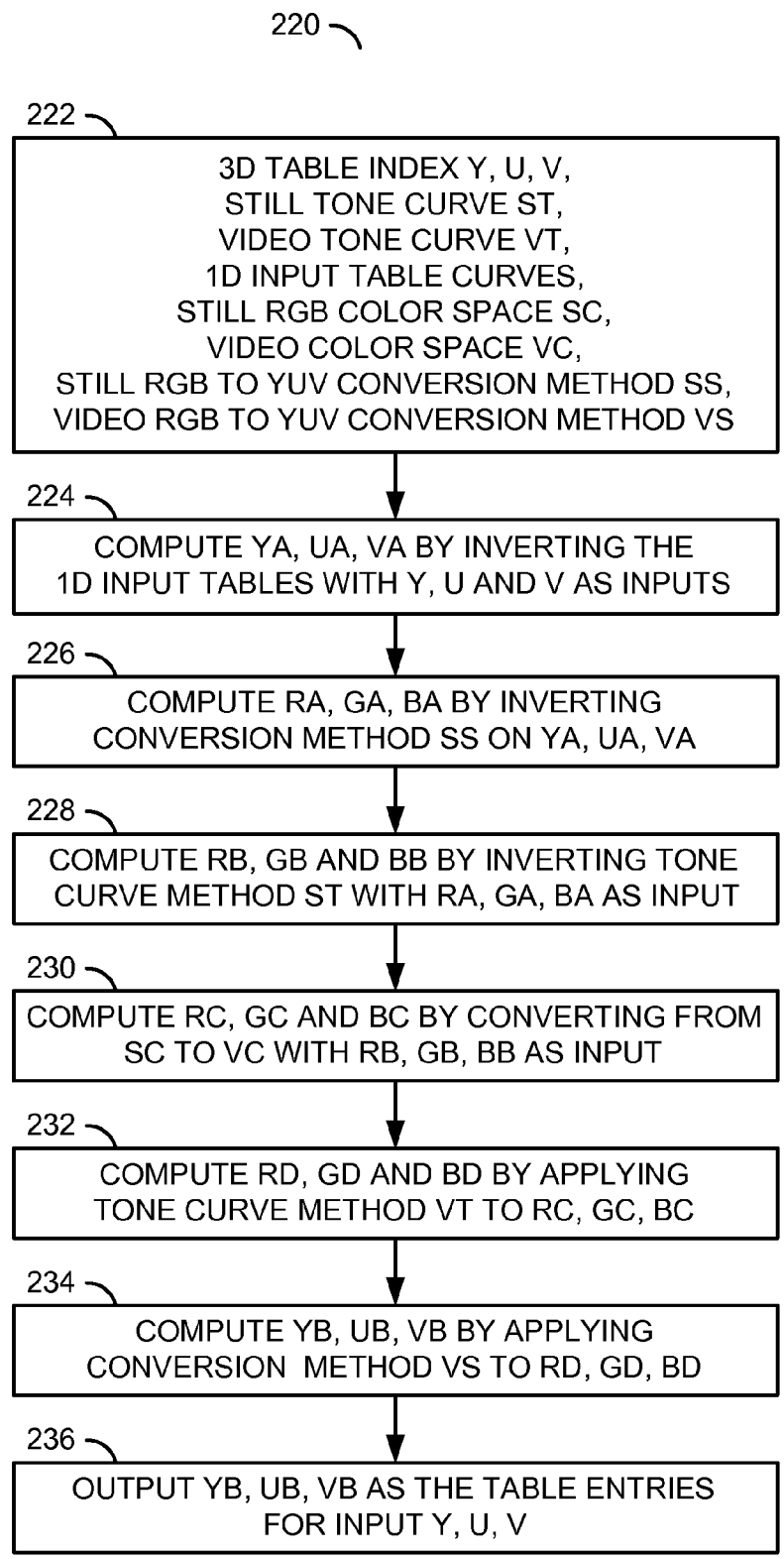
FIG. 10 is a flow diagram of an example method for programming a three-dimensional table for color correction during playback.

Referring to FIG. 10, a flow diagram of an example method 220 for programming a three-dimensional table for color correction during playback is shown. The method (or process) 220 may be implemented by a computer external to the apparatus 100. The entries calculated by the method 220 may be loaded into the circuit 104 (e.g., the circuit 164) to achieve a YUV to YUV color correction (e.g., step 210). The method 220 generally comprises a step (or block) 222, a step (or block) 224, a step (or block) 226, a step (or block) 228, a step (or block) 230, a step (or block) 232, a step (or block) 234 and a step (or block) 236.

The table entries are generally programmed (e.g., steps 224 to 228) to undo the effects of all color processing after white balance and before the lookup. In the step 222, criteria of the circuit 164 may be determined. The criteria generally includes, but is not limited to, (i) a range of table index values (e.g., Y, U and V) for the signals Y2, U2 and V2, (ii) a still picture tone curve (correction) method (e.g., ST), (iii) a video tone curve (correction) method (e.g., VT), (iv) the curves of the circuits 162a-162c, (v) a still picture RGB color space (e.g., SC), (vi) a video color space (e.g., VC), (vii) a still picture RGB to YUV conversion method (e.g., SS) and (viii) a video RGB to YUV color space conversion method (e.g., VS). The methods ST and VT may be any standard or proprietary tone correction methods. The color spaces CS and CV may be any standard or proprietary color spaces. The methods SS and VS may be any standard or proprietary color space conversion methods. The method 220 is generally applied for each entry in the circuit 164.

For example, if the circuit 164 implements a 32×32×32 table, the method 220 may be applied for each Y, U and V=[0, 1, . . . , 31] for a total of 32×32×32=32768 combinations of Y, U and V. In some embodiments, the circuit 160 may use 14 bits for each of the signals Y1, U1, V1, Y2, U2 and V2, so that each may be represented as an integer in a range [0,16383] and 10 bits for each of the signals Y3, U3 and V3, so that each may be represented as an integer in a range [0,1023]. In the step 224, the values YA, UA and VA are generally computed as the input to the lookup table (e.g., Y1, U1, V1 into the circuit 160) that may correspond to the exact grid point Y, U, V. For example, Y, U, V=[1, 3, 5] may correspond to Y2, U2, V2=1×16383/31, 3×16383/31, 5×16383/31=[528, 1585, 2642]. If the circuits 162a-162c implement identity tables, the step 224 may leave the values 528, 1585, 2642 unchanged (e.g., inverse of identity=identity) so that YA, UA, VA may also have the values 528, 1585, 2642. On the other hand, if the circuits 162a-162c implement nonlinear tables, like the curve 166 with a steep slope at the bottom and a flatter slope at the top, the step 224 may apply the inverse of such curves (steep slope at the top and a flatter slope at the bottom) to the values 526, 1585, 2642 and compute, for example, values of 96, 727, 2424.

A vector of representative values (e.g., RA, GA and BA) may be calculated in the step 226 by performing an inverse of the still picture conversion method SS on the representative values YA, UA and VA. The method SS may be the same as performed by the step 202 of FIG. 9. In the step 228, a vector of representative values (e.g., RB, GB and BB) may be calculated be performing an inverse of the still picture tone method ST on the representative values RA, GA and BA.

A vector of representative values (e.g., RC, GC and BC) may be calculated by converting the representative values RB, GB and BB from the still picture color space SC to the video color space VC in the step 230. The step 232 may calculate a matrix of representative values (e.g., RD, GD and BD) by performing the video tone correction method VT on the representative values RC, GC and BC.

In the step 234, the video RGB to YUV color space conversion method VS may be applied to the representative values RD, GD and BD to calculate a matrix of final values (e.g., YB, UB and VB) in the YUV color space. The representative values YB, UB and VB may be loaded into the circuit 164 in the step 236. The table entries may be programmed so that, to the extent that the method for converting between color spaces (step 230) is accurate, the effect of using the still picture color processing and then converting still YUV to video YUV using the method 200, the color may be the same as if native video color processing had been applied.

The lookup table-based corrections may be implemented in one or more areas in the processing path inside the apparatus 100. In some embodiments, the apparatus 100 may have lookup table-based correction hardware and/or software that may be configured to operate in at least two of the following modes: (i) an RGB to RGB color correction for processing a sensor picture (e.g., step 126 in FIG. 4), (ii) a YUV to YUV color correction for processing a sensor picture (e.g., step 134 in FIG. 4 and/or step 202 in FIG. 9) and (iii) a YUV to YUV color correction for playback of a still picture (e.g., step 210 in FIG. 9).

The functions performed by the diagrams of FIGS. 3-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a circuit configured to (i) process a digital image received from a camera sensor and (ii) color correct at least one pixel of said digital image after said processing, wherein (i) said color correction includes a lookup table-based conversion of said pixel from a first luminance-and-chrominance representation to a second luminance-and-chrominance representation, (ii) said lookup table-based conversion comprises a plurality of entries and (iii) a plurality of first colors have a closer spacing of said entries in a color space defined by said second luminance-and-chrominance representation than a plurality of second colors.

2. The apparatus according to claim 1, wherein said color correction does not involve converting said pixel to a red-green-blue (RGB) color space.

3. The apparatus according to claim 1, wherein said circuit converts said digital image as received from said camera sensor into a final image.

4. The apparatus according to claim 3, wherein said conversion does not include an RGB to RGB color correction.

5. The apparatus according to claim 3, wherein said circuit is further configured to compress said final image after said color correction.

6. The apparatus according to claim 3, wherein said circuit is further configured to write said final image in a storage medium.

7. The apparatus according to claim 1, wherein said circuit is further configured to generate a video signal based on said digital image after said color correction.

8. The apparatus according to claim 7, wherein (i) said apparatus forms part of a camera and (ii) said video signal is presented external to said camera through a video connector.

9. The apparatus according to claim 1, wherein said circuit is further configured to read said digital image from a storage medium before said color correction.

10. The apparatus according to claim 9, wherein said circuit is further configured to decompress said digital image after said reading from said storage medium and before said color correction.

11. A method for color correcting in a camera, comprising the steps of:
(A) processing a digital image received from an electro-optical sensor, wherein said digital image is represented by luminance-and-chrominance information; and
(B) color correcting at least one pixel of said digital image after said processing, wherein (i) said color correcting uses a lookup table-based conversion based on said luminance-and-chrominance information of said pixel, (ii) said lookup table-based conversion comprises a plurality of entries and (iii) a plurality of first colors have a closer spacing of said entries in a color space defined by a luminance-and-chrominance representation than a plurality of second colors.

12. The method according to claim 11, wherein said color correcting does not involve converting said pixel to a red-green-blue color space.

13. The method according to claim 11, wherein said entries used in said lookup table-based conversion are calculated to undo color processing performed before said lookup table-based conversion.

14. The method according to claim 11, wherein said entries used in said lookup table-based conversion are calculated to achieve an RGB to RGB color correction of said digital image.

15. The method according to claim 11, wherein said entries used in said lookup table-based conversion are calculated to achieve an RGB to RGB tone correction of said digital image.

16. The method according to claim 11, wherein said entries used in said lookup table-based conversion are calculated to convert said digital image from a still-picture color space to a video color space.

17. An apparatus comprising:
a circuit configured to (i) process a digital image received from a camera sensor, (ii) store said digital image in a storage medium after said process and (iii) perform at least two among (a) an RGB to RGB color correction of said digital image during said process, (b) a first YUV to YUV color correction of said digital image during said process such that in a configuration where both said RGB to RGB color correction and said first YUV to YUV color correction are performed, said first YUV to YUV color correction is performed independently from and after said RGB to RGB color correction, and (c) a second YUV to YUV color correction of said digital image after reading said digital image from said storage medium.

18. The apparatus according to claim 17, wherein said second YUV to YUV color correction includes a lookup table-based conversion from a first luminance-and-chrominance representation to a second luminance-and-chrominance representation.

19. The apparatus according to claim 18, wherein a plurality of entries used in said lookup table-based conversion are calculated to undo said RGB to RGB color correction.

20. The apparatus according to claim 18, wherein a plurality of entries used in said lookup table-based conversion are calculated to convert said digital image from a still-picture color space to a video color space.

* * * * *